(12) United States Patent
Eberhard et al.

(10) Patent No.: US 8,239,108 B2
(45) Date of Patent: Aug. 7, 2012

(54) DRIVE LINE OPERATION METHOD

(75) Inventors: Wilfrid Eberhard, Tettnang (DE);
Gerhard Hermann Martin, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 525 days.

(21) Appl. No.: 12/609,232

(22) Filed: Oct. 30, 2009

(65) Prior Publication Data

US 2010/0125397 A1     May 20, 2010

(30) Foreign Application Priority Data

Nov. 19, 2008 (DE) .......................... 10 2008 043 853

(51) Int. Cl.
*G06F 7/00* (2006.01)
(52) U.S. Cl. ............ 701/69; 701/58; 180/233; 180/197; 475/198; 475/86; 303/190
(58) Field of Classification Search .................... 701/58, 701/69; 180/233, 197; 475/198, 86; 303/190
See application file for complete search history.

(56) References Cited

U.S. PATENT DOCUMENTS

2002/0137595 A1* 9/2002 Markyvech et al. ............ 477/77

\* cited by examiner

*Primary Examiner* — Thomas G. Black
*Assistant Examiner* — Luke Huynh
(74) *Attorney, Agent, or Firm* — Davis & Bujold, P.L.L.C.

(57) ABSTRACT

A method for operating a vehicle drive train comprising a drive unit, a transmission, and an all-wheel splitter having a clutch. The all-wheel splitter is positioned between the transmission and the output and splits a transmission output torque to vary the torque distribution to driven axles of the output. The split of the output torque to the driven axles is performed by a control unit in such a way that the transmission output torque, less a predetermined nominal torque set by the all-wheel drive strategy, is transferred to a first axle while the nominal torque is transferred to a second axle. When defined operating conditions are met, a clutch monitoring function is activated and the nominal torque is replaced by a torque definition of the clutch monitoring function so that the torque which is transferred by clutch to the second driven axle, is increased, then kept constant, and thereafter reduced.

13 Claims, 3 Drawing Sheets

DRIVE LINE OPERATION METHOD

This application claims priority from German patent application serial no. 10 2008 043 853.7 filed Nov. 19, 2008.

FIELD OF THE INVENTION

The invention relates to a method of operating a drive train of a vehicle.

BACKGROUND OF THE INVENTION

The main components in a vehicle drive train are a drive unit and a transmission, whereby the transmission converts torque and rotational speed so that the drive unit pull force of the vehicle is provided at the drive train output.

SUMMARY OF THE INVENTION

This present invention relates to a method of operating a drive train which comprises, beside the drive unit and the transmission, an all-wheel splitter, between the transmission and the drive train output, including an automated clutch. The all-wheel splitter automated clutch is particularly configured as an all-wheel multiple disc clutch.

The clutch in such an all-wheel splitter, is automatically activated, is operated in a continuous slip mode, and splits a transmission output torque, for achieving a variable torque distribution for the output axles in a way so that the transmission output torque, less a predetermined nominal torque value based on the all-wheel drive strategy, is transferred to a first drive axle, a so called main drive axle, and the output and the nominal torque to a second, driven axle, the so called auxiliary axle, is transferred from the drive train. The all-wheel drive strategy, which sets the nominal torque and hereby the variable torque distribution between driven axles and the output, is implemented into a control unit of the drive train, preferably a transmission control unit.

Strict requirements, i.e., positioning accuracy, positioning dynamics, and disengaging dynamics, are expected from an automatically operated clutch of an all-wheel splitter. Because of the constant and continuous slippage present at the clutch, or the constant rotational speed difference between the output driven axles and their allocated elements of the clutch, respectively, the all-wheel splitter clutch is exposed to a high thermal and mechanical stress, which result in wear and, therefore, cause malfunctions of the all-wheel splitter clutch.

Thus far it was not possible to performing a check of the drive train, under regular operating conditions, for proper functioning of the all-wheel splitter clutch. Therefore, there is a need of a method for operating a drive train, through which the proper functionality of the automatic clutch of an all-wheel splitter of the drive train is automatically checked.

On this basis, this invention addresses the problem of creating a novel method for operating a vehicle drive train.

The present invention is, when particularly driving train operating conditions are defined for a given duration of time, a clutch monitoring function is activated, and the predetermined nominal torque, provided by the all-wheel strategy, is replaced by a torque value of the clutch monitoring unit in a way that, first, it increases the torque to be transferred which comes from the all-wheel splitter clutch to the second driven axle, thereafter, is kept constant, and thereafter again is reduced, whereby at least after the increase of the torque, which comes from the all-wheel splitter clutch to being transferred to the second driven axle, and, after the reduction of the torque of the all-wheel splitter clutch allocated to the second driven axle, a differential rotational speed value between the driven axles and their assigned all-wheel splitter clutch elements is established, whereby then, if at least one of the established changes of the differential rotational speed value is larger than a defined limit value, it is assumed that the all-wheel splitter clutch is functioning properly, whereas, if all established changes of the differential rotational speed value are smaller than a defined limit value, it is assumed that the all-wheel splitter clutch is not engaged properly.

The method, in accordance with the invention, allows a functional check of the automatically operated all-wheel splitter clutch of a vehicle's drive train to be performed automatically. Hereby, the safety of the drive train functionality is increased as well as the vehicle's driving safety.

BRIEF DESCRIPTION OF THE DRAWINGS

Preferred, additional embodiments of the invention, arise from the independent claims and the following specification. The embodiments of the invention, without being limited to, are explained based on the drawings. Hereby shows:

DETAILED DESCRIPTION OF THE PREFERRED EMBODIMENTS

Figure 1:
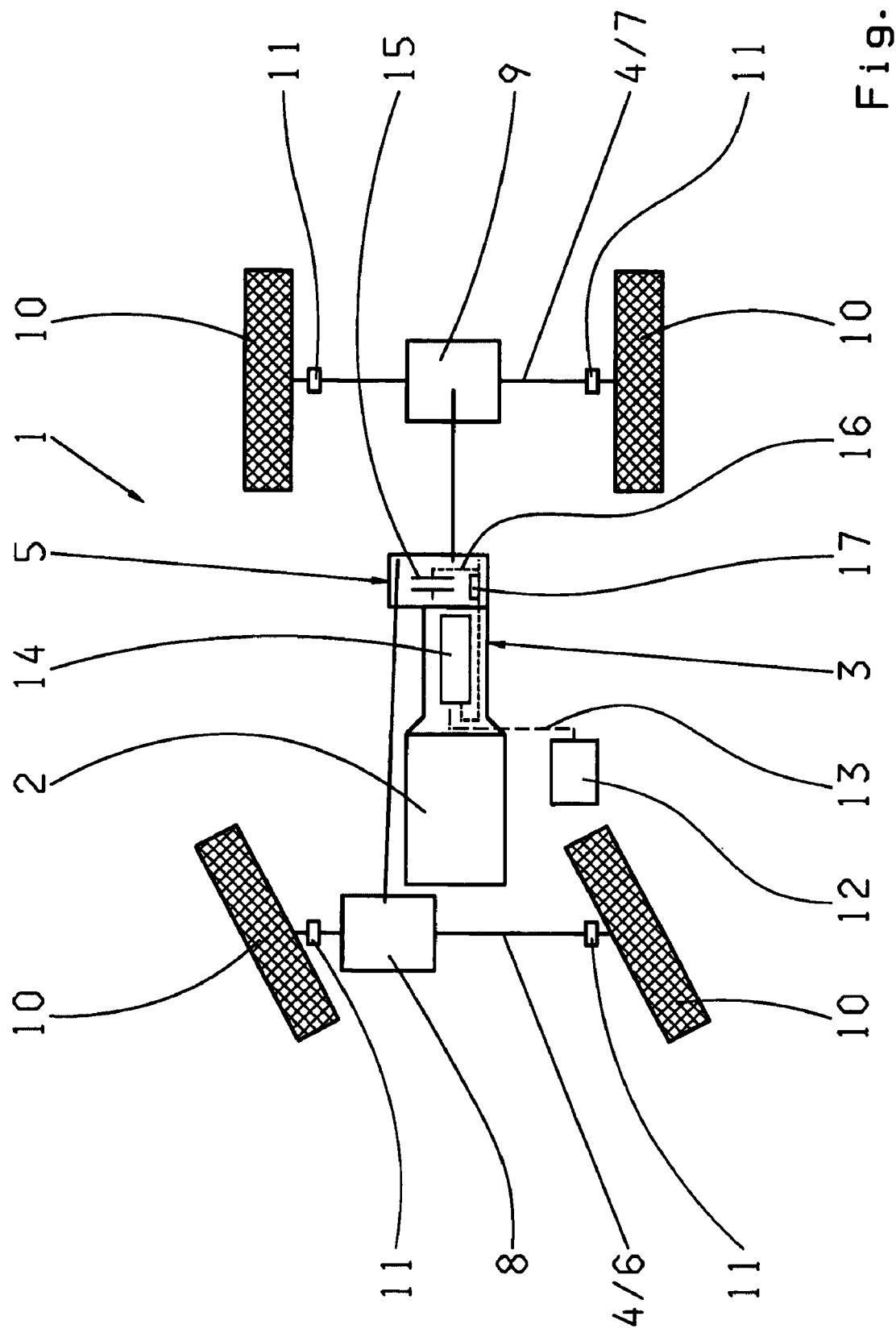
FIG. 1 is a schematic presentation of a drive train.

The invention presented here is concerning a method of operating a drive train of a vehicle, whereby a schematic presentation of an embodiment of a drive train, in which the invented method is used, is shown in FIG. 1.

Here, FIG. 1 shows a schematic presentation of a drive train 1 which comprises a drive unit 2, a transmission 3 and an all-wheel splitter 5, between an output 4 and the transmission 3, whereby the output 4, in the shown embodiment, is configured with two driven axles 6, 7. Each of the two driven axles 6, 7 of the output 4, in accordance with FIG. 1, is assigned a differential 8 or 9, respectively, whereby, in the shown embodiment, the differential 8, 9 for both axles 6, 7 provide a different axle drive ratio.

In addition, two wheels 10 are allocated to each axle 6, 7 whereby each of the wheels 10 has a rotational speed sensor. By the rotational speed sensors 11, the rotation of the individual wheel and the driven axle 6, 7 is calculated whereby, through communicating the wheel's rotational speed of one axle 6 or 7 and the allocated wheels 10, a rotational speed for each individual axle 6, 7 is calculated.

In accordance with FIG. 1, the transmission 3 has an assigned transmission control unit 12 through which the operation of the transmission 3 is controlled. In accordance with FIG. 1, the transmission control unit 12 is coupled to a hydraulic switch group 14 of the transmission 3, via a control signal line 13, to provide control signals to the hydraulic switching group 14 for operating the transmission 3.

The all-wheel splitter 5 comprises an automatically operated clutch 15 which, in the shown embodiment, is hydraulically activated and hereby is linked with the hydraulic switch group 14 of the transmission 3 via a hydraulic line 16. Therefore, the hydraulic switch group 14 of the transmission 3 provides a hydraulic pressure for operating the clutch 15, in the embodiment of FIG. 1, whereby the provided hydraulic pressure is monitored through an integrated pressure sensor 17 of the hydraulic line 16.

It is to be noted that the automatically operated clutch 15 may also be operated mechanically, electrically or in any other way.

The clutch 15 of the all-wheel splitter 14 is operated in a continuous slip mode whereby the clutch provides a transmission output torque of the transmission 3 to the driven axles 6, 7 of the output 4, and splits it in a variable torque allocation in a way that the splitting of the output torque of transmission 3 for the driven axles 6, 7 of the output 4 is predetermined in a transmission control unit 12 by default as an all-wheel drive strategy so that the transmission output torque, less the nominal default torque determined by the all-wheel drive strategy, is transferred to the first driven axle, i.e., axle 7, and the nominal torque is transferred to the second axle, i.e., axle 6.

At the time, when the predetermined nominal torque is set at zero, the entire transmission output torque is transferred to the first driven axle, i.e., axle 7.

Figure 2:
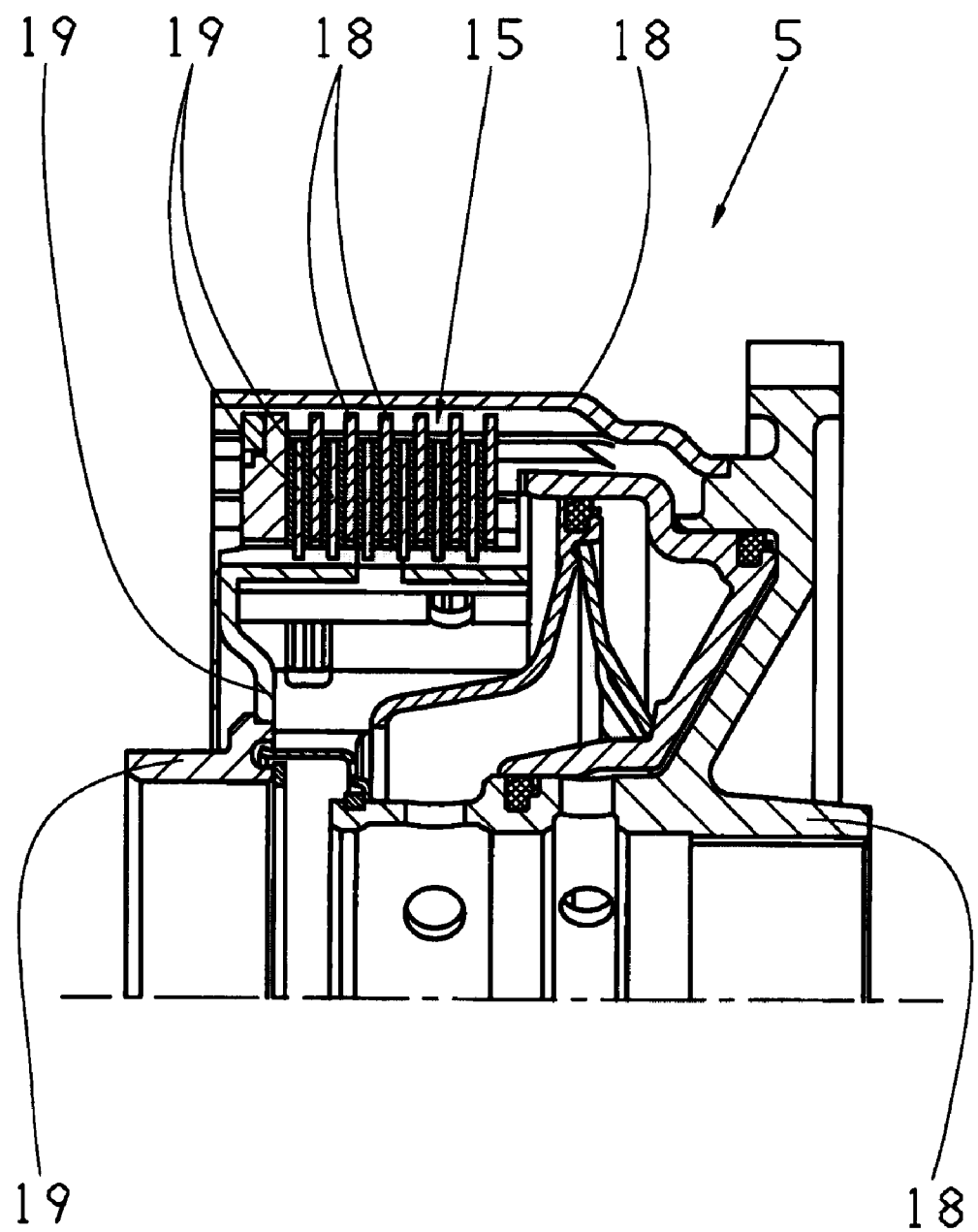
FIG. 2 is a detail of the drive train of FIG. 1.

FIG. 2 shows, in the area of its automatically operated clutch 15, details of the all-wheel splitter 5 whereby, in accordance with FIG. 2, the clutch 15 is configured as a multiple disc clutch. The clutch 15 of the all-wheel splitter 5, configured as multiple disc clutch, comprises a first set of clutch elements 18, through which the transmission output torque, less the nominal torque as being provided by the all-wheel strategy, is transferred to the first axle, i.e., axle 7, as well as a second set of clutch elements 19 through which the nominal torque, being set by the all-wheel strategy, is transferred to the second driven axle, i.e., axle 6, of the drive train 1.

Figure 3:
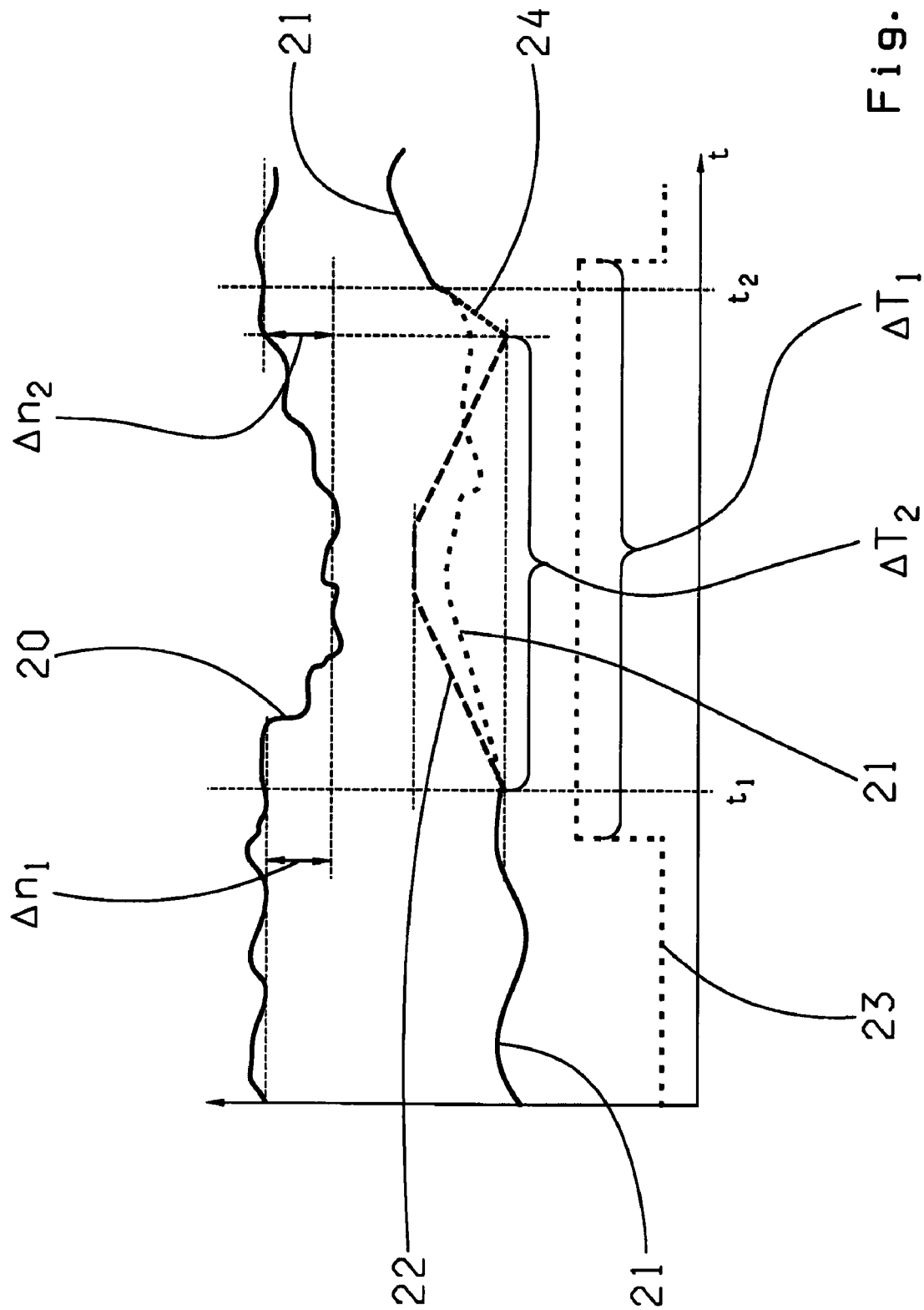
FIG. 3 is a diagram for the clarification of the inventive method.

The method of this invention, for operating such a drive train through which the proper functioning of the clutch 15 of the all-wheel splitter 5 of the drive train 1 is checked, is described in detail in the following with reference to FIG. 3, whereby FIG. 3 shows several time dependent signal waveforms over time t.

The first signal waveform 20 visualizes the timing of a differential rotational speed between the clutch elements 18, 19 of the clutch 15 of the all-wheel splitter 5 which are assigned to the driven axles 6, 7 of the output 4. A signal waveform 21 visualizes the timing of a nominal torque, being predetermined by the all-wheel drive strategy whereby the nominal torque 21, set by the all-wheel strategy in FIG. 3, is only active prior to the time $t_1$ as well as after the time $t_2$. In FIG. 3, between the time $t_1$ and $t_2$, the nominal torque 21, predetermined by the all-wheel strategy, is represented by a dotted line and inactive whereby, between the time $t_1$ and the time $t_2$, the nominal torque 21 is replaced by a default torque 22 of a clutch monitoring function so that FIG. 3 shows, between time $t_1$ and time $t_2$, the timing of the default torque of the clutch monitoring unit.

In addition, FIG. 3 shows a signal waveform 23 which demonstrates whether defined operating conditions, for activation of the clutch monitoring function, are met or not met. At the time when the timing of the signal waveform 23, meeting the operating conditions, takes the position of the lower signal level, the operating conditions for the activation of the clutch monitoring function are not met. However, when the signal waveform 23 of the operating conditions follows the higher signal level, the operating conditions for the activating and maintaining of the clutch monitoring function are met, whereby this is the case, in FIG. 3, during the period $\Delta T_1$.

In the sense of this invention and when defined operating conditions of the drive train are met for a defined duration of time, activation of a clutch monitoring function takes place and, when the default torque 21 is replace by the default torque 22 of the clutch monitoring function, in a way that it is first increases the torque, which is derived from the clutch 15 and to be transferred to the second driven axle, then being kept constant and subsequently being reduced again whereby, in accordance with FIG. 3, the increase of the torque is transferred from the clutch to the second driven axle, and the reduction of the torque is transferred from the clutch 15 to the second driven axle, through the clutch control, is processed in a linear form or a ramp shape form. This is seen, during the time $\Delta T_2$ as shown in FIG. 3, in the waveform 22 of the default torque of the clutch monitoring function.

In this invention, at least after an increase of the torque, particularly as a ramp shape increase derived from the clutch 15 and transferred to the second driven axle, and after the reducing, particularly a ramp shape reduction of the torque, which is derived from the clutch 15 and transferred to the second driven axle, a change in the differential rotational speed value is calculated, between the clutch elements 18, 19 of the clutch 15 of the all-wheel splitter 5, allocated to the driven axles 6, 7.

The change of the differential rotational speed value of the clutch elements 18, 19, following the ramp shape increase of the torque in FIG. 3, which is derive from the clutch 15 and transferred to the second axle, is shown in FIG. 3 by the value $\Delta n_1$. The change of the differential rotational speed value of the clutch elements 18, 19, after the ramp shape reduction of the torque, as in FIG. 3, which is deriving from the clutch 15 and is transferred to the second axle, is shown in FIG. 3 by the value $\Delta n_2$.

At the time when at least one of the calculated changes $\Delta n_1$ and $\Delta n_2$ of the differential rotational speed becomes larger than a default limit value, it is assumed that the clutch 15 of the all-wheel splitter is in a proper condition.

However, at the time when either one of the calculated changes $\Delta n_1$ and $\Delta n_2$ of the differential rotational speed become smaller than a default limit value, it is assumed that the clutch 15 of the all-wheel splitter is not in a proper condition.

As mentioned previously, for activating the clutch monitoring function of this invention, it is required to have defined operating conditions of the drive train 1, for a specified time, whereby the clutch monitoring function only remains activated if these defined operating conditions are met, when the clutch monitoring function was activated. If the defined operating conditions, while being in the activated clutch monitoring function, no longer met, the clutch monitoring function is terminated and the torque, which is transferred from clutch 15 of the all-wheel splitter 5 to the second driven axle, is again changed to the default torque value of the control unit.

This change to the default torque value, enabled by the control unit, takes place after the regular termination of the clutch monitoring function, whereby the change of the torque, which is transferred to the second axle from the clutch 15, after the regular termination of the clutch monitoring function into the control unit default torque value, is visualized by the signal waveform 24 in FIG. 3.

The clutch monitoring function is activated when the drive train reaches a defined motion performance and/or after reaching a defined amount of ignition cycles of the drive unit.

If, after a defined motion performance of the drive train 1 and/or after a defined amount of ignition cycles of the drive unit 2 and for a defined duration, more defined operating conditions of the drive train 1 are met, the clutch monitoring function is activated but only remains activated if such further operating conditions also are still being met during the execution of the clutch monitoring function.

Hereby, the clutch monitoring function is only activated and remains activated if the transmission 3 of the drive train is not performing a gear shifting and when the drive speed of the drive train 1 continues within a defined velocity range. In addition and preferably, the movement of an accelerator pedal needs to be within a defined activation range, and/or driving straight, and/or the velocity nearly constant.

A straight driving condition is detected by capturing the steering angle, whereby a straight driving condition is only given if the captured steering angle ranges between a defined steering angle value.

The monitoring of the accelerator pedal makes sure that while the clutch monitoring function is performed, a driver is not setting much variation to the drive parameters.

In the case that the transmission of the drive train 1 is not performing a gear shift and when the accelerator remains almost constant and, if the drive velocity is within a defined range, and if the car is driving straight ahead, a constant driving condition exists in which the clutch monitoring function is activated and remains activated.

It might be the case, in addition, that a clutch monitoring function is only activated or remains activated if an additional drive-dynamic control system of the drive train is activated and/or if, in addition, the transmission temperature stays within defined temperature ranges. Through the condition that a drive-dynamic control system is activated for enabling the clutch monitoring function, an unstable drive condition, while performing the clutch monitoring function, is avoided.

Also, the clutch monitoring function, between the clutch elements 18, 19 of the clutch 15, is preferably only activated if a defined differential rotational speed value is present for hereby making sure that during the activation of the clutch monitoring function, a sufficient change of the differential rotational speed value is recognized.

The calculation of the change $\Delta n_1$ of the differential rotational speed value between the clutch elements 18, 19 of the clutch 15, after increasing the torque, to be transferred to the second driven axle, preferably takes place in a way so that, on the one hand, before the increase, on the other hand, after the increase of the torque to be transferred to the second driven axle, being provided by the clutch 15, that in each case an average differential rotational speed value is calculated, whereby a spread between the two average differential rotational speed values of the change $\Delta n_1$ is correlating with the differential rotational speed value, after the increasing the torque which needs to be transferred from the clutch 15 to the second driven axle. A differential rotational speed value, between the clutch elements 18, 19 of the clutch 15, is correlated with the differential rotational speed value between the driven axles 6, 7 which have the assigned clutch elements 18, 19, whereby the differential rotational speed value between the driven axles 6, 7 is calculated by the assigned rotational speed sensors 11 of the wheel 10.

The calculation of the change $\Delta n_2$ of the differential rotational speed value between the clutch elements 18, 19 of the clutch 15, after reducing the torque which needs to be transferred to the second driven axle, takes place analog manner meaning that, on one hand, before reducing and, on the other hand, after reducing, in each case an average differential rotational speed value is calculated, whereby the spread between the two average differential rotational speed values correlates with the change $\Delta n_2$ of the differential rotational speed value, after reducing the torque which needs to be transferred from the clutch to the second driven axle.

In the case that, during executing the inventive clutch monitoring function, it is assumed that the clutch is not operating properly and, thereafter, the above mentioned defined operating conditions of the drive train are again met for a defined duration, the clutch monitoring function is enabled again, for checking the results of the previous clutch monitoring function. If hereby, after a defined number of consecutive clutch monitoring functions, it is assumed in each case that the clutch is not working properly, this invention suggests generating, within the control unit, a related display and/or recording the error for the driver. Also, when the clutch is recognized as not functioning properly, deactivation of the clutch 15 of the all-wheel splitter 5 takes place in that case.

The clutch monitoring function is implemented in a control unit, particularly in the transmission control unit 12 of the transmission 3 or also, not shown here, in the engine control unit of the drive unit 1.

REFERENCE CHARACTERS

1 Drive Train
2 Drive Unit
3 Transmission
4 Output
5 All-Wheel Splitter
6 Axle
7 Axle
8 Differential
9 Differential
10 Wheel
11 Rotational Speed Sensor
12 Transmission Control Unit
13 Control Signal Line
14 Hydraulic Switch Group
15 Clutch
16 Hydraulic Line
17 Pressure Sensor
18 Clutch Element
19 Clutch Element
20 Signal Waveform of Rotational Speed Difference
21 Signal Waveform of nominal Torque Value
22 Signal Waveform of Torque Set Point
23 Signal Waveform of Meeting Operating Conditions
24 Signal Waveform of Torque Set Point Transfer to the nominal Torque Value

The invention claimed is:

1. A method of operating a drive train of a vehicle in which the drive train comprises a drive unit, a transmission, and an all-wheel splitter having an automatically operated clutch, the all-wheel splitter being positioned between the transmission and an output, whereby the clutch of the all-wheel splitter being operated in such way that the all-wheel splitter splits a transmission output torque in the sense of a variable torque distribution for driven axles of the output, whereby the splitting of the transmission output torque for the driven axles being set by a control unit, implemented in an all-wheel drive strategy in such a way that the transmission output torque, less a nominal torque which being set by the all-wheel drive strategy, being transferred to a first driven axle, and the nominal torque being transferred to a second driven axle, the method comprising the steps of:

activating a clutch monitoring function if defined operating conditions of the drive train are met, replacing the nominal torque, set by the all-wheel strategy, by a default torque of the clutch monitoring function in such a way that the torque, which being transferred to the second axle by the clutch, is first increased, then maintained constant, and then reduced again, whereby at least after the increasing of the torque being transferred from the clutch to the second drive axle, and after the reducing of the torque being transferred by the clutch to the second driven axle, calculating a change of a differential rotational speed value, between the driven axles and assigned clutch elements, and if at least one of the calculated changes is higher than a defined limit, assuming that the clutch is operating properly, and when all calculated changes in the differential rotational speed value are lower than the defined limit value, assuming that the clutch is not working properly.

2. The method according to claim 1, further comprising the step of performing each of the increase of the torque, which is transferred from the clutch to the second driven axle, and the reducing the torque, which is transferred from the clutch to the second driven axle by the clutch monitoring function, in a ramp shape.

3. The method according to claim 1, further comprising the step of in an event that the method assumes that the clutch is not working properly, and thereafter, meeting the defined operation conditions for a defined duration, again once again activating the clutch monitoring function for checking a result of the previous clutch monitoring function.

4. The method according to in claim 3, further comprising the step of if, after a defined number of consecutive clutch monitoring functions in which the method assumes that the clutch is not working properly, one of generating a respective display for a driver and recording an in the control unit.

5. The method according to claim 3, further comprising the step of if, after a defined number of consecutive clutch monitoring functions in which the method assumes that the clutch is not working properly, deactivating the clutch.

6. The method according to claim 1, further comprising the step of, if the activated clutch monitoring function does not meet at least one of the defined operating conditions of the drive train, terminating the clutch monitoring function and transferring the torque from the clutch to the second driven axle to the nominal value set by the control unit.

7. The method according to claim 1, further comprising the step activating the clutch monitoring function and allowing the clutch monitoring function to remain active only if the transmission is not performing a gear shifting and when a drive velocity of the drive train stays within a defined velocity range.

8. The method according to claim 7, further comprising the step of activating the clutch monitoring function and allowing the clutch monitoring function to remain active if at least one of an acceleration pedal movement is present within a defined activating range, straight driving is occurring and the driving velocity is substantially constant.

9. The method according to claim 7, further comprising the step of activating the clutch monitoring function allowing the clutch monitoring function to remain active if a drive dynamic control system of the drive unit is activated.

10. The method according to claim 7, further comprising the step of activating the clutch monitoring function allowing the clutch monitoring function to remain active only if a transmission temperature stays within a defined temperature range.

11. The method according to claim 9, further comprising the step of activating the clutch monitoring function, by meeting the defined operating conditions of the drive train, when at least one of a defined running performance of the drive train is achieved, when a defined amount of ignition cycles of the drive unit are performed, and if results of a previous clutch monitoring function shows that the clutch is not working properly.

12. The method according to claim 1, further comprising the step of calculating a change of the differential rotational speed value, between the clutch elements of the clutch of the all-wheel splitter, after the increasing of the torque which is transferred from the clutch to the second driven axle, and calculating an average differential rotational speed value prior to the increasing and after the increasing, whereby a spread of both averaged differential rotational speed values are correlated with the change of the differential rotational speed value, after the increasing of the torque which is transferred by the clutch to the second driven axle.

13. The method according to claim 1, further comprising the step of calculating a change of the differential rotational speed value, between the clutch elements of the clutch of the all-wheel splitter, after the reducing of the torque which is transferred by the clutch to the second driven axle, and calculating an average differential rotational speed value prior to the reducing and after the reducing, whereby a spread of both averaged differential rotational speed values are correlating with the change of the differential rotational speed value, after the reducing of the torque which is transferred by the clutch to the second driven axle.

* * * * *